Aug. 28, 1962 W. J. FRY ET AL 3,051,167
TIMING AND SEQUENCE CONTROL CIRCUITRY
Filed July 23, 1957 4 Sheets-Sheet 3

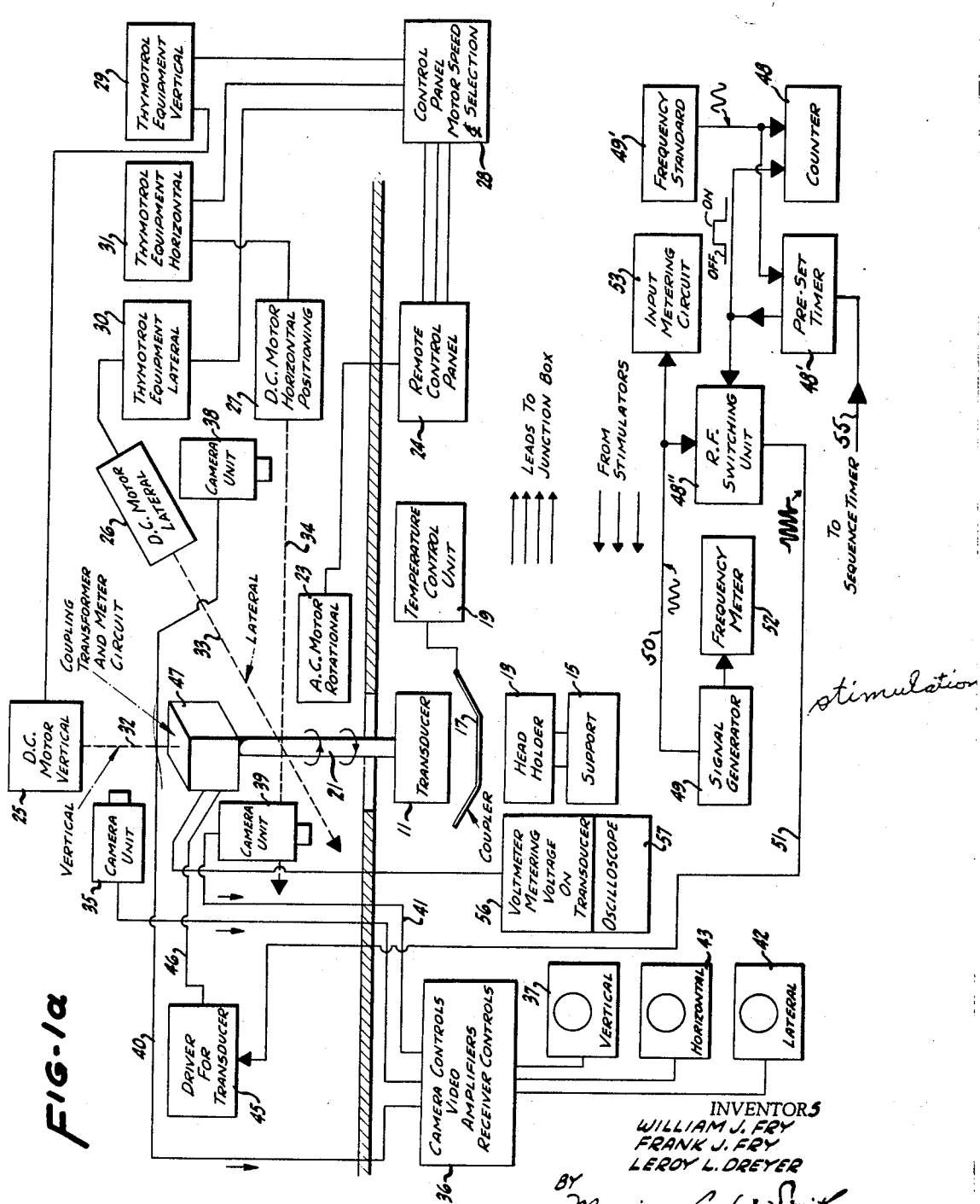

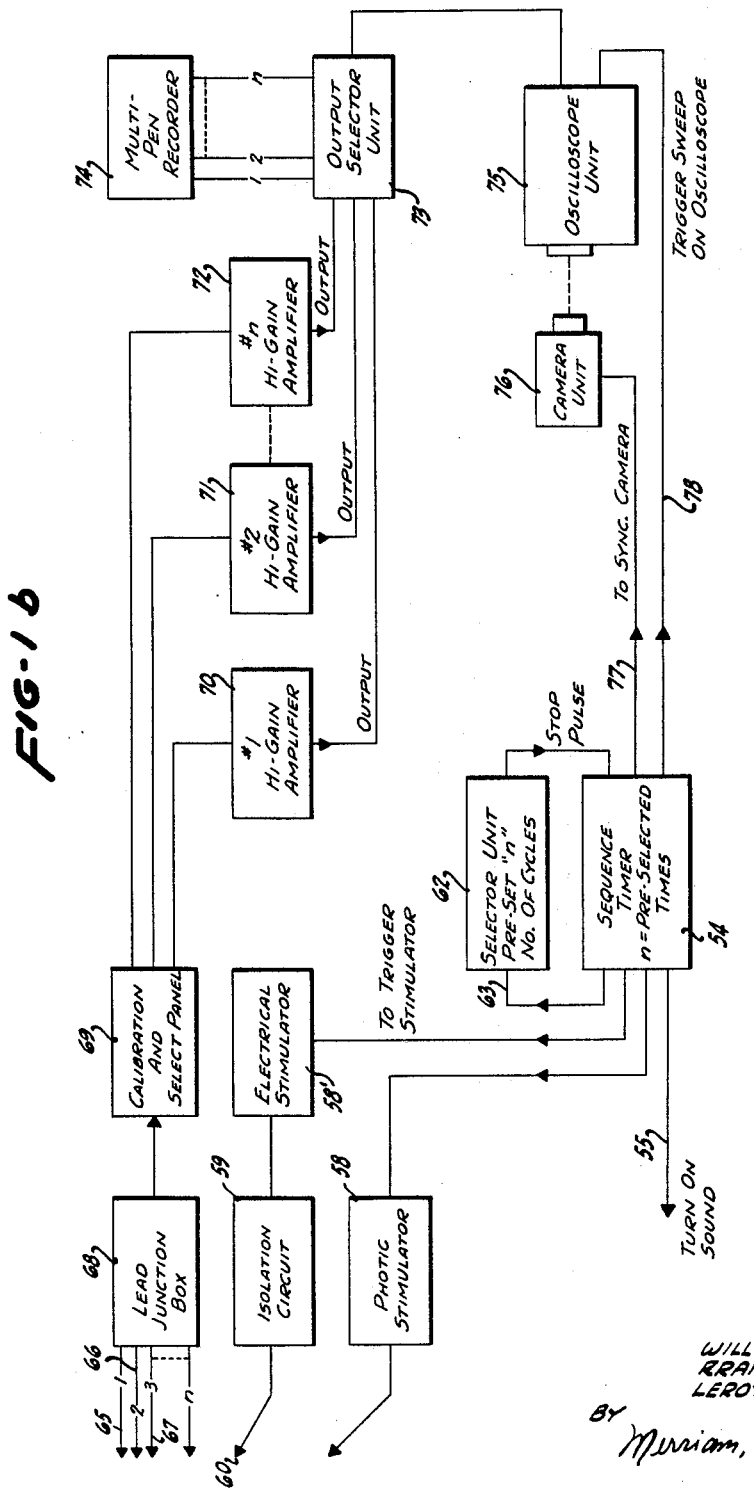

INVENTORS
WILLIAM J. FRY
FRANK J. FRY
LEROY L. DREYER

By Merriam, Lorch & Smith
ATTORNEYS

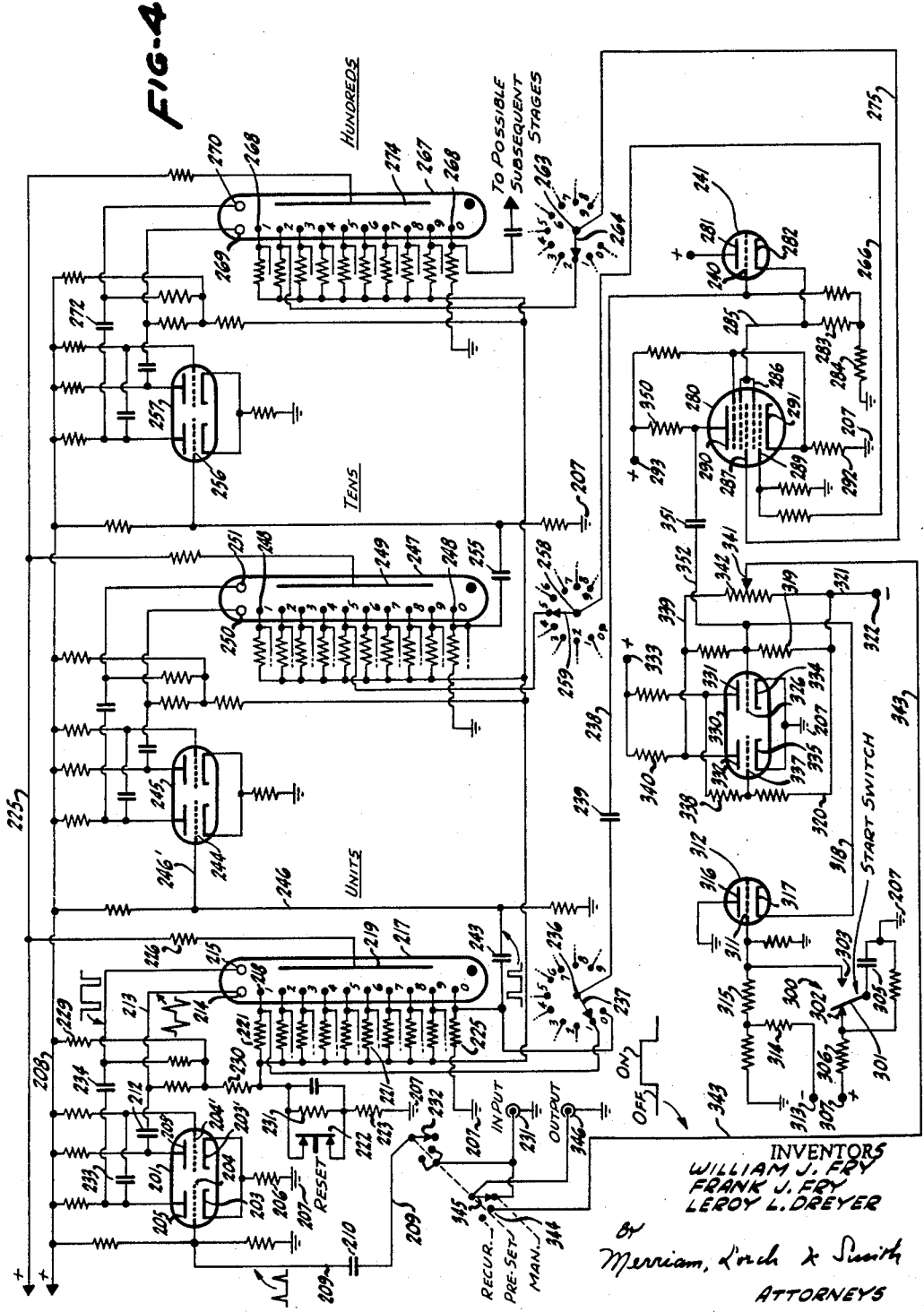

United States Patent Office 3,051,167
Patented Aug. 28, 1962

3,051,167
TIMING AND SEQUENCE CONTROL CIRCUITRY
William J. Fry, Frank J. Fry, and Leroy Dreyer, Champaign, Ill., assignors to University of Illinois Foundation, Urbana, Ill.
Filed July 23, 1957, Ser. No. 673,595
1 Claim. (Cl. 128—24)

This invention relates broadly to apparatus and circuitry for timing and controlling a sequence of various events. In the particular adaptation in which the invention is here to be described, it will be illustrated with respect to apparatus used for producing small localized changes in living tissue, such as the central nervous system, which changes may be either reversible or irreversible in nature, as desired, without the use of surgery in the region to be treated.

A substantial amount of experimental and practical work has been carried on in the recent past with respect to the effects of accurately controlled doses of ultrasonic waves and the selective production of changes of the aforesaid character of almost any desired shape and depth without affecting the intervening tissue. This was accomplished through the use of a plurality of transducer elements functioning to develop sound waves at frequencies substantially above audibility (illustratively, frequencies as high as one megacycle) with the effects of the developed waves being focused at a common focal point, as desired, within the tissue to be treated. To achieve the desired end result, it is important that among other controls there should be an extremely accurate control of the dosage duration, intensity (or other appropriate acoustic variable) and frequency of the sound and the repetition rate. Likewise, in the achievement of the desired end result, it is frequently necessary or desirable to stimulate by external means the system to be subjected to the treatment. Such stimulation may be effected in various ways, included among which are photic stimulation and electrical stimulation.

Many reports of the early developments in this field of endeavor have been issued. Most of the preliminary reports have been contained in various technical journals, with many of the problems and certain of the early apparatus having been described illustratively in "The Journal of Comparative Neurology," vol. 103, for December 1955, in an article entitled "Effects of High Intensity Ultrasound on the Central Nervous System of the Cat," by J. W. Barnard, William J. Fry, Frank J. Fry and Rolfs F. Krumins. Another publication is that reported in an article appearing in the "AMA Archives of Neurology and Psychiatry," for January 1956, vol. 75, pages 15 through 35, by J. W. Barnard, William J. Fry, Frank J Fry and J. F. Brennan. Still another article reporting certain of the early work is that by William J. Fry entitled "Neurosonic Surgery" which appeared in the publication of the "American Institute of Ultrasonics in Medicine," reporting the proceedings of the Fourth Annual Conference on Ultrasonic Therapy in Detroit, Michigan, on August 27, 1955.

Certain further work has been identified and described in the pending U.S. application for Letters Patent, Serial No. 554,607, filed December 22, 1955, by William J. Fry and Frank J. Fry, and entitled "Method of Treating Living Tissue"; and, by the pending U.S. application for Letters Patent, Serial No. 642,964, filed February 28, 1957, by the same inventors, and entitled "Production of Reversible Changes in Living Tissue of Ultrasound." The various publications above mentioned and patent applications are herein referred to as related to the general background of the invention herein to be disclosed and described and as setting forth broadly the problem involved.

In the invention herein to be disclosed, the general composite system for achieving the desired end result is set forth and comprises suitable apparatus of the prior art for supporting the subject and the transducer component for developing the sound waves and focusing the same in the subject. Provisions are also made for orienting the mechanism through suitable controls adapted to effect tridimensional linear positioning and rotational orientation of the transducer equipment. Such equipment may be operated through suitable remote controls or directly. The effects of the positioning may be remotely observed where desired. Various forms of controls for establishing the operation of the transducer equipment for the purpose of precisely regulating those periods of activation are provided through appropriate driving circuitry. Stimulation of the subject, if required, may be effected by either electrical, photic means or other types of stimulation, as desired. The timing of the operation of the transducer to produce ultrasound, as well as the activation of the stimulation components, may be effected through a control initiated by the operation of accurately functioning timing apparatus. Each of the components of the system is arranged to be operated in a precisely timed sequence with respect to an initiating event so that each operation is accurately timed with respect to a standard and with respect to each other. Likewise, the effects of stimulation of the subject are ascertained through appropriate translating apparatus and registered in any desired fashion—as by a written record, the photographic record or a transient type of record such as would be obtained by viewing an oscilloscope. Each of the recording components likewise may be controlled and timed in its operation by the counter mechanism so that each of the visual and permanent records may be synchronized and timed with respect to any desired sequence of events.

In the development of the operation herein to be set forth, it becomes one of the main objects of the invention to provide precision and accuracy of the timing of any number of events with respect to other events and selectively to register such effects in appropriately timed relationship to each other.

Other objects of the invention are those of providing improved controls and circuitry for making more useful apparatus particularly adapted for ultrasonic excitation and/or changing of tissue and producing therein lesions or reversible changes without the use of surgery in the tissue to be treated.

Other objects of the invention are those of coordinating a multiplicity of controls with transducer apparatus and concurrently stimulating the system to be treated, while accurately regulating the stimulation effects in timed relationship with respect to sonic irradiation as well as with respect to each other.

Other objects of the invention are to provide improved operations and more ready usability of ultrasonic irradiation equipment and, at the same time, to provide greater efficiency in the use and control thereof.

Other objects of the invention will become apparent and suggest themselves to those skilled in the art to which the invention is directed when the following description and claims are considered in conjunction with the drawings forming a part hereof, wherein:

FIG. 1 by its parts 1a and 1b (which may be used in combination) is a diagrammatic showing of an assembly of the apparatus with controlling components showing the relative relationship between each and illustrating the components in block form;

FIG. 4 is a circuit diagram illustrating the operation and control of the selector and sequence timer.

Figure 2:
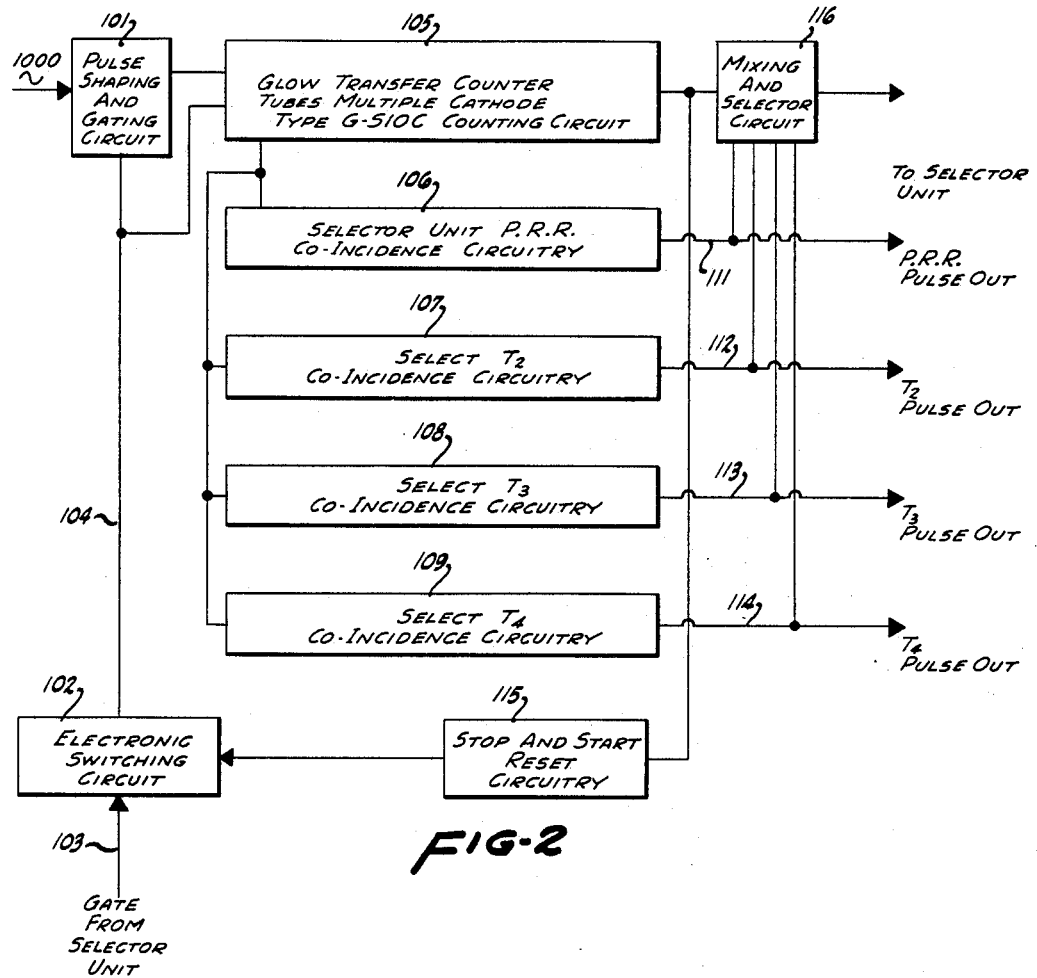
FIG. 2 is also a block diagrammatic showing of the control effected by the selector and sequence timer for establishing a control of the event sequence.

Referring now to the drawings for a further understanding of the invention, the transducer equipment is indicated generally by the reference numeral 11 and, as is known in the art, comprises suitable irradiating equipment (for example in the form of multiple heads) and controlled components adapted to excite the unit to develop ultrasound. The schematic illustration here is provided in view of the showing of the component in each of the above referred to publications. The transducer is arranged to focus the issuing ultrasonic waves upon or within a subject, the head of which is supported in any desired form of head holder, schematically represented at 13, which is supported, in turn, on a suitable support mechanism 15. These components likewise are known in the prior art and depicted by the cited publications.

Coupling is effected by way of a coupler 17 normally in the form of a pan to which the head to be exposed is sealed and to which a tight fit is made. As is known in the art, the pan is then filled, for coupling purposes, with sterile temperature controlled degassed salt water solution so as to conduct the sound from the transducers 11 to the tissue which it is desired to treat. The temperature of the solution held within the coupler or pan 17 is appropriately controlled by any desired or known temperature control unit conventionally represented at 19.

The transducer is supported upon the schematically shown tube 21 for rotation as indicated by the arrows under the control of a suitable rotational motor 23, conventionally shown and adapted to be controlled in its operation from a remotely located control panel 24.

Vertical, lateral and horizontal positioning of the support tube 21 for the transducer 11 is provided by the conventionally represented motors 25, 26 and 27, respectively. These motors are controlled also from the remote control panel 24 through suitable conductors operating through the conventionally represented speed control component 28 to control equipments designated schematically as units 29 for the vertical motor 25, 30 for the lateral motor 26, and 31 for the horizontal motor 27. Control units available for the purpose of this invention are, per se, known in the art and are sold under, for example, the trade name of "Thymotrol" units.

By a control of the remote control panel 24 and the selective energization of the various control components 29, 30 and 31, provisions can be made for varying the position of the transducer 11 relative to the coupler and the head holder 13 in each of three linear directions. In the event that the support for the tube 21 locating the transducer is at a location remote from the transducer component itself, and it is desired to view the precise position of the component from remote points, recourse may be had to closed circuit television apparatus.

In this event, the vertical motor 25 operates to raise or lower the transducer tube 21 through the connection with the schematically represented shaft 32. Similarly, the lateral motor 26 provides lateral adjustment through the schematically shown shaft 33. The horizontal motor 27 effects an equivalent result in a horizontal plane by way of the schematically represented shaft 34. The various shafts 32, 33 and 34 may be scored or marked on their peripheries so that when explored by their associated camera components of well known character which are connected into a suitable closed circuit television camera chain, the camera unit 35 will serve to carry to a camera control video amplifier and receiver rack, conventionally represented at 36, indications of the precise position of the shaft 32 which then may be pictorially displayed on a television reproducer tube 37 of well known character. Similarly, camera units 38 and 39, respectively, may be used to produce video signals available by way of the conductors 40 and 41, respectively, to the camera controlled video amplifier and receiver tube apparatus 36 so that precise indications of the lateral and horizontal positioning of the transducer tube may be pictorially portrayed upon the viewing apparatus 42 to show the lateral displacement and on the viewing apparatus 43 to show the horizontal. The complete camera chain control circuitry and viewing instrumentalities are well known components in the art and are therefore designated merely by the schematic showings.

Consider now the supply of driving energy to the transducer 11 for initiating the development of ultrasonic waves, electrical energy of chosen frequency and magnitude is supplied to the transducer 11 from a driver component 45 in the form of a relay tube or the equivalent, the output of which is supplied through conductor 46 to a suitable coupling transformer and metering device schematically shown at 47. This is usually in the form of a transformer which is here indicated merely schematically and the output of which is fed through connecting circuitry to the transducer element 11 in now well known fashion.

The driver component 45 for controlling the transducer 11 is energized by the output of a combination of a counter 48, a timer 48' and a therewith associated switching unit 48" which will be further discussed generally in connection with the operation of the circuitry depicted particularly by FIG. 4. Energy to supply the transducer is developed at suitable ultrasonic frequency which for example, is approximately the order of one megacycle per second, by a stabilized oscillator or signal generator schematically shown at 49. The signal generator or oscillator 49 may be of any desired form subject to developing oscillating energy of desired frequency appropriately stabilized as to amplitude and frequency, as well as to the general wave form, in well known fashion which can be supplied by way of the conductor 50 to constitute an input signal to the switching unit 48" whose selected output pulse frequency is then supplied by way of conductor 51 to the transducer driver or relay tube assembly schematically shown at 45.

The wave form of the pulse on conductor 51 is a selected number of cycles of the signal generator 49 interrupted according to the general pattern shown adjacent thereto.

Figure 3:
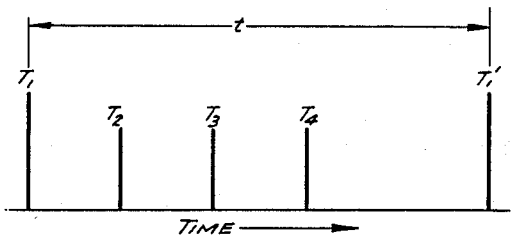
FIG. 3 is a schematic illustration of an assumed sequence of timing obtainable with the diagrammed apparatus of FIG. 2.

The broad control is achieved by applying an oscillating wave of suitable standard frequency developed by a stabilized oscillator conventionally represented at 49'. Output from this last named oscillator feeds into both the counter 48, of any well known form, and a timer 48', also of any well known digital type. The timer output, as diagrammed, feeds into both the switching unit 48" and the counter 48 to apply the pulse wave thereto as a keying signal. The counter 48 is generally merely a checking device to indicate the time duration of any selected event. The R.F. switching unit 48" is also shown merely schematically since it is of known form and is merely controlled by a keying pulse of the general character shown.

Where desired, a frequency indicating meter 52, or the equivalent, may be utilized to establish the precise frequency generated by the signal generator 49. The timer 48' is controlled by an input from the conductor 55 which is in the form of a wave as shown by FIG. 3 and derived as later explained from components like those of the sequence timer of FIG. 4.

The component 54, shown more particularly in its details in FIG. 4, and represented in FIG. 1b is for this purpose.

Further reference will be made to overall combination to describe in further details the sequence timer. At this moment, however, it may be desirable to note that the input signal supplied to the transducer 11 from the driver 45 is preferably constantly measured and observed as to its magnitude or the effective voltage by means of an indicator 56 connected to receive also the output signal from the coupler component 47. This signal may be read directly upon a meter or it may be observed by the schematically illustrated oscilloscope combination shown at 57. Although not shown herein for convenience of illustration, it will be understood that calibration of the transducer equipment and the therewith associated circuit components is preferably provided by way of any suitable mechanism to measure the sound pressure, amplitude, and/or particle velocity or other acoustic variables. In this respect, the calibration may be provided by a thermo-couple probe placed within a calibration tank in which suitable solution is included and with the solution maintained at the desired temperature. In this instance, the calibration tank and the thermo-couple probe is placed in the general region indicated in the drawing of FIG. 1 by the component 13 to support the head of the subject being explored in order that the measured conditions shall be generally similar.

In many cases, it is desirable during the time period when the subject held by the holder 13 is being irradiated, that the subject may also be exposed to stimulation. This stimulation may be of several varieties as examples of which types a photic stimulator, conventionally represented at 58, may be considered as one variety, and an electrical stimulator, conventionally represented at 58′, may be considered as of another variety. Still other forms are usable as will be evidenced to those skilled in the art.

These stimulators are each of the well known character and are, therefore, merely schematically represented. It will be understood, as an example, that the photic stimulator may be any form of device which is appropriately controlled to flash light observable by the subject which then will produce responses within the brain following stimulation which can be suitably measured or recorded.

Likewise the electrical stimulation may be by way of electrical energy fed to the subject by a connection through electrodes or contact members where the excitation is of pulsed nature over a controlled time period. The electrical stimulation is usually applied by way of appropriate isolation circuitry such as an isolation transformer, conventionally represented at 59 and adapted to feed the output of the electrical stimulator through the conventionally represented electrode 60 to the subject under test.

Control of the excitation of any or all of the stimulating excitation components is controlled, as already pointed out, by the sequence timer schematically represented at 54 and diagrammed from its circuit standpoint more particularly by the showing of FIG. 4. The sequence timer in turn serves to connect a selector unit 62 to establish the desired control of the pulse output to any of the output conductors indicated therefrom as leading to the photic stimulator 58, the electrical stimulator 58′, or any other desired components. Each of these components may be controlled by the output of one of the coincidence type tubes such as that shown at 280 in FIG. 4 operating through the relay or control circuit of the tube 330.

The timing of the initiating pulse output from the sequence timer 54 may schematically be considered to be represented by the starting time shown by FIG. 3 as the time $T_1$ with the maximum period of any one cycle being illustratively shown by the time period $T'_1$, this latter period $(t)$ being the period represented by the maximum count of the cascaded series of decade counters shown illustratively at 217, 247 and 267 of FIG. 4. In the illustrated instance, the decade system will count from 1 through 1000 prior to repeating so that assuming the input pulse frequency available at the input terminal 231, also shown in FIG. 1 as appearing upon the conductor 63, and the frequency applied being assumed as 1000 cycles, the counter combination will count through a one-second time period. An addition of another stage of the digital counter would expand this time period by a factor of 10 and provide for counting from zero through to 10 seconds. Thus, as shown by the schematically shown FIG. 3, the time $(t)$ during the separation between the initiating or start period $T_1$ and the terminating period $T'_1$ may be, with the digital system assumed, any desired power of 10 with three stages making the period of $10^3$, four stages $10^4$ and so on.

The intervening time periods shown at $T_2$, $T_3$ and $T_4$ can be any proportion of the time between the start position or zero time $T_1$, and the maximum time assumed as $T'_1$. Illustratively, the control of the photic stimulator 58 might be brought about so as to bring it into operation at the time $T_1$ and to arrest its operation at the time $T_2$. Also, illustratively, the electric stimulator 58′ might be considered to be brought into action at the start period $T_1$ (or at any other time desired) and for its operation to be arrested at the time $T_3$. Alternatively, the pulses $T_2$, $T_3$ and so on may serve to initiate operation of the stimulators and the units themselves may then contain operation arrested equipment to shut them off prior to a time $T'$, or at a time $T'_1$.

Lastly, the control of the energization of the transducer 11 from the counter 48, the timer 48′ and switching unit 48″ may be such that the operation is initiated at the start time $T_1$ and arrested at an indicated time at or prior to $T'_1$. All of these times are purely illustrative and serve merely to illustrate in principle the operation. Other time periods may be chosen and the time $(t)$ should be regarded merely as illustrative.

In order to indicate the effects of photic, electrical or other types of stimulation on the subject, various probes 65, 66, 67 and so on may be attached to the subject under test either by connection to the brain or some other point in the nerve system. The electrical signals developed by such connection are supplied through the probes to a conventionally indicated lead junction box from which one or another selection may be made and supplied through the selection panel 69 and appropriate amplifiers 70, 71, 72, and so on, to an output selector unit, schematically represented at 73. The amplifiers 70, 71 and 72 are all utilized for providing high signal gain without appreciable distortion from the input of the selection panel. Output signals, as amplified, are available at the output selector unit 73 and may there be selected manually or otherwise to be recorded as a permanent record by a schematically illustrated multi-pen recorder unit, conventionally shown at 74, adapted to record each channel in any desired fashion.

Likewise, similar effects may be directly observed visually by supplying the output from the output selector unit 73 to the conventionally represented oscilloscope 75. The indications on the oscilloscope 75 may then be directly observed visually or, where desired, may be permanently recorded by photographing, as by a camera unit 76. In either instance it is usually preferable to select the time of portraying the instantly available transient effect on the oscilloscope 75 by way of control effective from a sequence timer 54, which can be had by appropriate selection of coincidence tubes and output circuits thereby controlled and available over the conductor 77. The operation of the camera unit 76 should be synchronized with the oscilloscope unit 75 which can be done by way of a control serving to trigger the camera and synchronize it under the contact of the signal available on the conductor 78.

The event sequence broadly outlined by the diagrammed apparatus of FIGS. 1a and 1b is more particularly shown by the block diagram of FIG. 2. In this figure, the input frequency of any appropate oscillator (not shown) developing any desired input signal frequency is supplied to a pulse shaping and gating circuit of known character generally serving to distort a sine wave to a pulse formation, as is well known in the art. This pulsing and shaping unit may be then controlled by any appropriate form of electronic switch schematically shown at 102 deriving a control voltage by way of an input control 103 and serving to control through its output, as available on the conductor 104, both the pulse shaping and gating circuit and digital transfer counter devices, such as those shown by FIG. 4 by tube units 217, 247 and 267, and so on. These tubes are controlled by the various single shot multivibrators 201, 245 and 257, and so on. This complete component is diagrammatically shown at FIG. 3 by the numeral designation 105.

The selector units provided by the multiplicity of switching components such as those shown at 236, 258 and 263 functioning to control and develop appropriate output signals by way of coincidence tubes illustratively shown at 280 are schematically represented on FIG. 2 by the components 106, 107, 108 and 109. In this instance, the output available at the terminal point 346 in FIG. 4 and on conductor 55 in FIG. 1 may be considered to be that signal which is available on the conductor 111 of FIG. 2. Likewise, in FIG. 2 for illustration purposes, the signal output to the photic stimulator 57 may be assumed to be that derived on the conductor 112 and that output to the electrical simulator 58 may be that output derived on the conductor 213 of FIG. 2. FIG. 2 illustratively shows an additional output 114 assumed to be developed for an additional set of switching and coincidence components. Where it is desired to reset all of the components concurrently, the electronic switching circuit schematically shown at 102 may be reset from the stop and reset circuit illustratively shown, such as that represented in FIG. 4 at 222 and shown at 115 on FIG. 2 as the schematically represented component 115. If desired, all of the signals may be mixed together in a mixing component 116 and then supplied to the output circuits for triggering purposes or applied to an oscilloscope for visual representation or pen recorder for reference markers.

The selector units generally designated 236, 258 and 263, as aleady stated, can be set to count any desired number of cycles of the incoming control pulse. One form of circuit particularly suitable for this purpose is shown by FIG. 4 of the drawings. In its preferred form, this circuit comprises a plurality of single shot multivibrators operating in conjunction with a plurality of glow-transfer decade counter tubes, coincidence tube functions in conjunction with each decade counter tube to control the output from a pulse developing multivibrator unit to control the cycling of any desired component.

The circuit of FIG. 4 as thus shown comprises a single shot multivibrator tube 201 which conveniently may be in the form of a double triode, although the device functions as a plurality of separate tubes. The tube sections of the counter 201, or the separate tubes, comprise the cathode elements 203 and 203', grid or control electrode elements 204 and 204', and the plates or anodes 205 and 205'. Appropriate cathode bias is applied by way of the common cathode resistor 206 connected to a point of fixed potential, such as ground 207. Operating potentials for the tube are applied from a source of positive potential (not shown) having its positive terminal connected to the connector 208 and its negative terminal connected to ground. Biasing and load resistors connect between the plates or anodes and the source of positive potential, as indicated. Grid bias is applied through the indicated resistors to the grid.

As the tube 201 is shown, it may be assumed that the right hand half, comprising the tube electrodes 203', 204' and 205', is normally drawing current so that in the absence of any control pulse applied to the grid or electrode control 204 through the conductor 209 and the capacitor 210, the left hand tube half is cut off. For this condition, with the start of current flow through the right hand half of the tube section, a negative pulse is passed through the coupling condenser 212 and the conductor 213 to the guide electrode 214 of the glow-transfer decade counter tube conventionally represented at 217. This tube may be one of the type known in the art as GS-10-C manufactured by the Atomic Instrument Company of Cambridge, Massachusetts. It comprises an envelope in which there is housed the #1 and #2 guide electrode elements 214 and 215, together with a multiplicity of cathodes 218 which, as indicated, may be numbered from 1 through 10 (the 10 being shown as a 0 for convenience) and an anode element 219. Each of the cathodes 218, except the 0 or 10 unit, connects to ground 207 through a cathode resistor 221, the reset contactor 222 and a resistor 223 connected in series therewith, although the latter may at times be omitted with appropriate choices in circuit parameters. Suitable operating biasing voltage for the anode 219 is supplied from a source of positive voltage (not shown) usually higher than that supplied to the anode elements of tube 201. This voltage is shown as being derived from the conductor 225 and supplied through the anode resistor 226.

The tube type conventionally shown at 217 is generally well known in the art and preferably comprises for a decade counter a ring of 30 contact points of which every third point forms one of the cathode elements 218. Each intervening third point may be considered to be connected and serves to form the #1 guide electrodes 214. The remaining intervening points are all connected and form the #2 guide electrodes 215. The tube operation is generally well known but to complete this description will be referred to, to a limited extent in the circuit explanation to follow. Where the connection is as shown, it will be observed that the cathode marked 0 within the tube 17 is connected to ground 207 through the cathode resistor 225 so that with no current flowing, this cathode element of the tube is maintained at ground potential. To reset the unit to start the operation and to place any glow discharge beween the anode 219 and the cathode element 218 which is identified as the "0" (zero, as a count in a unit of ten) connection, the reset button 222 is pressed so that by the indicated connection from the conductor 208 through resistors 229 and 230, together with the resistor 231 which shunts the reset button 222, a voltage divider is formed which places each of the cathode elements 218, which has been numbered as 1 through 9, inclusive, at a potential which is positive relative to ground 207 and precludes any glow discharge occurring between these elements and the anode 219. Consequently, the initial or start position is established.

With current then flowing through the right half of the multivibrator 201, an initial negative pulse, with a commencement of current flow, is transferred through the coupling conductor 212 and conductor 213 to the guide electrode 214, so that glow discharge then tends to take place in the ring between the guide electrode 214 and the anode 219, it being understood, of course, that each of the elements identified as the cathode 218 and numbered as 1 through 0 in the diagram, is arranged in a circular pattern with the anode 219 being a disc centered with respect thereto, one of each of the guide electrodes 214 and 215 separates any two adjacent cathodes. In the assumed condition, considering the circular arrangement, the cathode element 218 which is marked by the letter "0" will be followed in the ring by a first guide electrode 214, to be followed by a second guide electrode 215 and then the cathode element 218 next adjacent, which is marked by the number 1 for the first one of the group, followed by the guide electrode 214 and 215, after which a cathode 218 which is marked as number 2 will be present. The showing of the diagram of the drawing is thus purely conventional.

With the receipt of a pulse on the input conductor 209 derived at the input terminal 231 and supplied through the switch 232, the conductor 209, capacitor 210 and then conductor 209 again to the control electrode grid 204 of the left-hand tube half is carried positive, and the left-hand half of tube 201 commences to draw current. At this time the plate or anode 205 tends to become negative with respect to its previous state (that is, the plate becomes less positive) and a pulse is transferred through the coupling condenser 234 to the guide electrode 215 at which time the glow discharge between the anode and one of the elements is transferred to the said guide electrode 215. At the same time a pulse is transferred through the coupling condenser 233 to the grid electrode 204' at the right-hand half of the tube which immediately tends to cut off the control therein. This results in a positive pulse at the plate 205' which is followed by a negative pulse. The second negative pulse (that is, following the positive pulse at the plate or anode 205) transfers the glow to the other guide electrode 214 at which time the discharge is between the anode element 219 and the guide 214 from which the discharge is promptly transferred to the next adjacent cathode element and one pulse unit is registered which will be the first in the assumed sequence.

At this time it may be noted that the switching unit generally designated 236 has a series of contactors numbered as "1" through "10" arranged thereabout. The armature or contact element 237 of this switch may be brought to rest against any one of the series of contact points, as shown. As this invention has been diagrammed, the contactor 237 of the switch 236 contacts terminal point 1 thereof so that as soon as glow discharge occurs between the cathode 218, which in the decade system is marked as "1," and the anode 219, a pulse will be transferred through the switching unit 236 and the contactor 237 to the conductor 238 through the coupling condenser 239 to the control grid element 240 of a relay tube 241, later to be further described.

As soon as the pulse applied through the conductor 209 and condenser 210 to grid 204 has ended (and the pulse is of a duration narrow type) the tube or multivibrator 201 returns to its initial state so that the left-hand half of the combination ceases to conduct and the right-hand half returns to a conducting state. At this time the reduction in potential (relative to ground 207) at the anode 205' is transferred as a negative pulse through the condenser 212 and conductor 213 to the guide electrode 214 to ready the tube 217 for counting the next received pulse, at which time the operation repeats in the fashion heretofore explained. However, since the assumed position of the contact arm 237 on the switch 236 is not at position 2, no resultant effect takes place at tube 241, although the glow discharge within the tube 217 changes its position from the number "1" cathode element 218 to the number "2" cathode element 218. For convenience of illustration the connections from the various cathode elements 218 of tube 217 (and similar connections of other like tubes) to the other contact points have not been drawn in. It will, however, be noted that like numbered cathode points of tube 217 connect to like numbered contact points of switch 236. Similar conditions hold relative to tubes 247 and 267 and their associated switching units 258 and 263 respectively.

Until a sequence of steps of the aforesaid character occurs to carry the tube 217 through ten (10) successive switching stages, as per the decade system, no energy pulses are transferred therefrom unless the switch arm or conductor 237 is appropriately changed. However, regardless of the position of the switch arm or contactor 237 when ten (10) pulses have been received and registered on the tube 217 so that the glow discharge is finally produced between the cathode element 218 which is marked "0" and the anode 219, a pulse is transferred through the coupling capacitor 243 to the control electrode 244 of a second one-shot multivibrator tube combination conventionally reported at 245. This pulse is supplied to the grid or electrode control 244 from the coupling capacitor 243 through the conductors 246 and 246'.

The tube 245 functioning as the one-shot multivibrator is, like the tube 201, arranged so that the right-hand half is normally in the conducting state. Receipt of any control impulses constituting the output from the "0" or "10" cathode element 218 of the tube 217 causes the multivibrator combination 245 to function in precisely the same manner as did the already described component 201. Therefore, the description of the component 245 will not here be necessary, it being understood that a pulse is received at the control grid 244 following each tenth pulse applied to the control grid 204 of the multivibrator of the combination 201. The functioning of this tube 247 is therefore an operation which counts tens instead of units as for the first tube. The tube 247 is reset to an initial state in precisely the same fashion as was the tube 217 and its cathode elements 248 provide glow discharge to the anode 249 under control of the multiplicity of guide electrodes 250 and 251 in the fashion already expressed for the tube 217.

Thus, after the receipt of each ten impulses by the tube 217, the tube 247 functions to transfer the glow discharge between the anode 249 and one or the other of the cathode 248 until following the receipt of 100 impulses on the conductor 209, a pulse is transferred from the tube 247 and that one of its cathode 248 which is marked "0" through the coupling condenser 255 to the control grid 256 of the indicated multivibrator combination 257. It will be noted that for the glow transfer decade cathode tube 247, its associated switch element 258 has its switch armature 259 illustratively shown as contacting the contact point numbered as "5." This means that in the final count in the system, since that here shown is adapted to count as $10^3$, the unit number is 1, the assumed 10's number is 5 and as will later be seen the 100's number, as derived from the position of switch element 263 and its contactor 264 is shown as 2. Therefore, with this combination a pulse will be transferred from the glow transfer decade counter tube 247 through the switch 258, the switch arm 259 and the cathode 248, which is identified by the number "5," through the conductor 266, each time 50 impulses are received on the conductor 209. With the receipt of the 100th impulse on the conductor 209 finally carrying the discharge within the glow transfer decade counter tube 247 so that it occurs between the cathode 248 which is marked by the identification "0" and the anode 249 so that a pulse is passed through the coupling capacitor 255 to the control grid 256 of the multivibrator 257, the right-hand half of the tube combination shown at 257 is again, and in the same manner already explained, carried to a non-conducting state while the left-hand half of the combination is caused to conduct. This condition then transfers (it being assumed that at the start all discharge occurs to the cathode element marked "0" of each of the tubes) the glow discharge of the glow transfer decade counter tube 267 (which is counting in 100's) from the cathode element 268 which bears the identification "0," from the guide electrode 269 to the guide electrode 270 and thence immediately to the cathode element 268 which carries the marking identification "1" because guide electrode 270 is carried to a negative state by a current flow through the left half of tube 257 causing the plate potential to drop and the negative pulse to be transferred through the coupling condenser 262 to the control grid 270. It will be understood that tube 267 functions so that it establishes the operation where glow discharge occurs between the anode 274 and the cathode element which is nearest to the guide electrode 270. Detailed description of the operation at this point likewise can be eliminated in view of the description given in detail for the unit counter.

As the tube 267 counting the 100's of pulses is diagrammed, and with the switch contactor 264 shown on the point "2," output pulses are derived on the conductor 275 when each glow tube takes place between the cathode 268 bearing the identification "2" and the anode 274. Thus, for the illustrated combination, the gating tube 280 will be carried to an operative state, that is, a current passing state, whenever 251 pulses are received on the conductor 209 which is the only time when a positive voltage pulse simultaneously appears upon each of the conductors, 238, 266 and 275.

Considering now the operation of providing the control pulse on the trigger or gating tube 280 which is due to the unit count, the positive pulse derived in conductor 238 and supplied through coupling condenser 239 to the grid element 240 of the relay tube 241 is transferred through this tube acting in cathode-follower fashion by way of the current flowing between the anode 281 and the cathode 282 to ground through resistors 283 and 284. Since the tube operates in cathode-follower fashion, the potential available on the conductor 285 to apply to the number "3" grid 286 is of the same polarity as that conductor 238. Since in reaching the count assumed at "251" the 100's tube 267 has already counted a sufficient number of pulses so that discharge takes place between the number "2" cathode 268, and anode 274 becomes available on conductor 275, this pulse is applied to the numer "2" grid 287 of the tube 280. Likewise, if counting the assumed "251" the discharge will have taken place in the 10's glow transfer decade cathode tube 245 at the number "5" cathode element 248, the positive pulse is transferred by way of the conductor 266 to the number "1" grid 289 of the tube 280. With all of grids 289, 287 and 286 positive, current can flow through the tube 280 between the anode 290 and the cathode 291 to ground 207 by way of the cathode resistor 292, plate voltage having been applied to the tube from the indicated source at the terminal point 293, for registering the count and for controlling the apparatus and thereby developing an output pulse to stop or arrest any cycling in the operation as a whole. At the start of the operation a switch element 300 which had originally had its armature 301 connected to the contact point 302 is shifted from the indicated position of the drawing to the contact point 303. In the position in which the switch is shown in the drawing, the capacitor 305 had been charged through the resistor 306 from a source of positive potential connected to the terminal point 307 so that the capacitor 305 was charged with its upper plate positive to ground 207, throwing the switch armature 301 from the contact point 302 to the contact point 303, thus applies a positive potential from the condenser 305 to the grid or control electrode 311 of the tube 312, the grid, prior to such time, having been effectively biased negative by the voltage applied biasing source connected at the terminal point 313 and supplied through the resistor combination 314 and 315.

The plate or anode 316 of this tube is suitably biased relative to the cathode 317 so that when the grid or control 311 is carried positive current flows through the tube section. The circuit of the tube cathode 317 is completed through the conductor 318, the resistor 319 and conductors 320 and 321 to a source of negative potential (not shown) connected at the terminal point 322. This holds the tube cathode negative relative to its grounded plate 316.

Since the tube 312 is provided as a cathode follower, the potential effect at the grid or control electrode 311 is transferred in like sign to the grid or control electrode 326 of an output tube 330. Accordingly, at time periods corresponding to those at which the armature 301 of the start switch is placed against the contact point 303 as above described, the right half of the tube 330 commence to draw current. In this section of the tube the plate or anode 331 is appropriately biased through its suitable load resistors as is the plate or anode 332 of the left half of the tube which connect to a terminal point 333 whereat a source of positive voltage (not shown) is applied. The cathode elements 334 and 335 of this output tube are connected together and to ground at 207. With the commencement of current flow in the right half of the tube 330, the direct connection from the plate 331 to the grid 337 of the left half of the tube through resistor 338 promptly cuts off the left half of the tube with the result that through the conductor 339 and across the load resistor 340 of the left half of the tube, the potential drops to coincide with that effective at the plate or anode 332. Accordingly, by suitable adjustment of the tapping point 341 on the output potentiometer 340, an output pulse of negative sign is available on the conductor 343 to be supplied to the output point 344 and through the output switch 345 to the conventionally indicated output terminal 346 which may, if desired, be the usual form of coaxial cable with a grounded outer shell and a conducting inner cable.

At times when the reverse condition takes place and the right half of the tube 330 is cut off, the opposite condition takes place and the potential on the conductor 343 is in the positive sense. A condition of coincidence between all of the signal inputs available on the coincidence tube 280 (this being represented by pulse simultaneously present on the conductors 266, 275 and 285 to be applied to the grid elements 289, 287 and 286, respectively, of the coincidence tube) causes current to flow therein with the resultant decrease and the potential available at the plate or anode 290 so that the pulses available across the output resistor 350 of the coincidence tube 280 if transferred through the coupling condenser 351 and conductor 352, are also negative at the grid or electrode 356 of the output tube 330. Hence, the effect of the negative pulse is then received. The resultant output wave-form is schematically depicted adjacent to the conductor 343 as a schematic representation of the conditions obtained.

For the conditions assumed, it may be considered that the initiation of the operation effected by a closure of the starting switch by moving the switch armature 301 against the contact point 303 after the reset switch 222 has previously been operated to start all of the glow transfer decade counter tubes at the same position or state, the first timing pulse will produce the initiation of the wave-form shown adjacent to the conductor 343. Since it is desirable in most conditions to provide the selector unit with control pulses to indicate the time of initiation of an operation and the time of termination thereof, and also desirable to provide during this selected time period a plurality of other indicated effects, various additional coincidence circuits and timer devices may be utilized. To this end, additional switching units such as those conventionally represented at 236, 258 and 263 may be provided. Each of these units has ten switching positions to correspond to the number of points or units established by the decade counter tubes and with a multiplicity of switches, individual switches can be set to different selected counts. In the form in which the operation has been above explained, it was assumed that the switches there shown would provide a count of 251 pulses at the input. This is a perfectly workable selection, but more frequently in the operation it has been found illustratively that the switch units 236, 258 and 263, if set at the "0" point on each, will provide a control pulse which is initiated at the first count and at the thousandth count. The switches for the remaining operational conditions and for the selection of other events and the timing of other events relative to the time base established by the switching units 236, 258 and 263 may then count to lesser numbers. Illustratively, one condition might be established after "112" counts. A second condition might be established afer "189" counts. A third condition might be established after "511" counts, and so on. The significant factor is that by establishing the particular counting position indicated, it is possible to repeat the sequence of events in precisely a desired order and with a precise time separation obtained in the first operation of the component. Even so, the operation is extremely flexible and the various switching units are readily adjustable for timing and selecting each event desired.

While the counter has been shown and described in the form by which the invention is illustrated as being of the "decade" variety, it is to be understood that this is but one of many types which are useable. As an example, the counter units may be based upon some other number other than "ten" and, illustratively, on "twelve" or any other number. The significant point is that the transfer occurs following a series of control pulses of any selected number corresponding to the "base" of the counter unit which, in a decade control device, will be ten. Accordingly, in the claims the term "base of the counter unit" will be understood to mean that base upon which the system is controlled. Likewise, where "decade" is used to define the counter, it will be understood to include any equivalent term such as a binary, a unit of 12, a unit of 17, or any other number selected.

Still further, in consideration of the hereindescribed invention, it should be borne in mind that the input pulses need not be of fixed frequency although this is usually the case for most types of operations, although from time to time the frequency may be changed during an operational sequence. To this end it may be noted that the input pulses, while usually of fixed frequency, may be varied, if desired, and even occur under extreme conditions as random pulses.

Having now described the invention, what is claimed is:

In apparatus for ultrasonic irradiation of a subject, the combination comprising a source of stabilized oscillations at a frequency above audibility, a plurality of transducers each to convert the source frequency oscillations to sonic energy, means to focus the sonic energy developed by each transducer at a common focal point at a finite distance therefrom, a counter circuit, a connection between the counter circuit and the plurality of transducers, means controlled by the counter circuit following a preselected count number to initiate transducer excitation and subsequently to arrest transducer excitation following a second preselected number of source oscillations means for stimulating the nerve system of the subject concurrent with irradiation, means controlled from the counter circuit for initiating and arresting the operation of the stimulating means, and means for registering the effects of the stimulation in the subject.

References Cited in the file of this patent

UNITED STATES PATENTS

| | | |
|---|---|---|
| 2,696,572 | Schmid | Dec. 7, 1954 |
| 2,730,655 | Geisler | Jan. 10, 1956 |
| 2,752,914 | Pohlman | July 3, 1956 |
| 2,789,557 | Davis | Apr. 23, 1957 |
| 2,860,627 | Harden | Nov. 18, 1958 |
| 2,829,308 | Foote | Apr. 1, 1958 |
| 2,876,764 | Guttner | Mar. 10, 1959 |

OTHER REFERENCES

The Journal of General Physiology, vol. 26, 1942–1943, pages 179–193.